United States Patent [19]
Zener

[11] 3,805,515

[45] Apr. 23, 1974

[54] MODULARIZED SEA POWER ELECTRICAL GENERATOR PLANT

[75] Inventor: Clarence Zener, Pittsburgh, Pa.

[73] Assignee: Carnegie Mellon University, Pittsburgh, Pa.

[22] Filed: June 11, 1971

[21] Appl. No.: 152,295

[52] U.S. Cl. .................................................. 60/641
[51] Int. Cl. ............................................... F02g 1/00
[58] Field of Search ................................. 60/26, 36

[56] References Cited
UNITED STATES PATENTS
2,006,985  7/1935  Claude.................................. 60/26

FOREIGN PATENTS OR APPLICATIONS
250,664  7/1948  Switzerland............................ 415/7

OTHER PUBLICATIONS
Albert G. Ingalls, "Inexhaustible Power from Sea Water — a Dream or a Prophecy?", May 1927, pages 339–342, Scientific American.

Primary Examiner—Edgar W. Geoghegan
Assistant Examiner—H. Burks, Sr.
Attorney, Agent, or Firm—Buell, Blenko & Ziesenheim

[57] ABSTRACT

An electrical generating plant utilizing temperature differentials (thermoclines) between various levels of the ocean having modularized boiler units, condenser units, and engine units which are adapted for assemblage in a stacked array to form a power unit. Any number of power units can be efficiently and economically connected together and attached to a pair of prefabricated pipes to form a generating plant.

16 Claims, 22 Drawing Figures

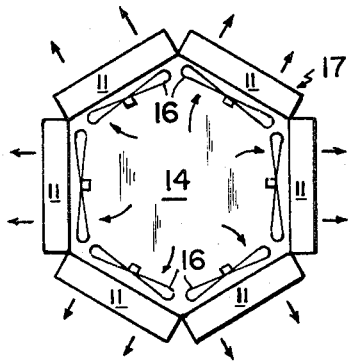
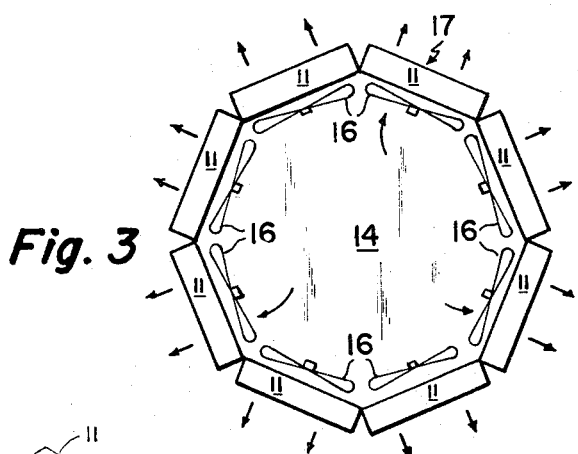
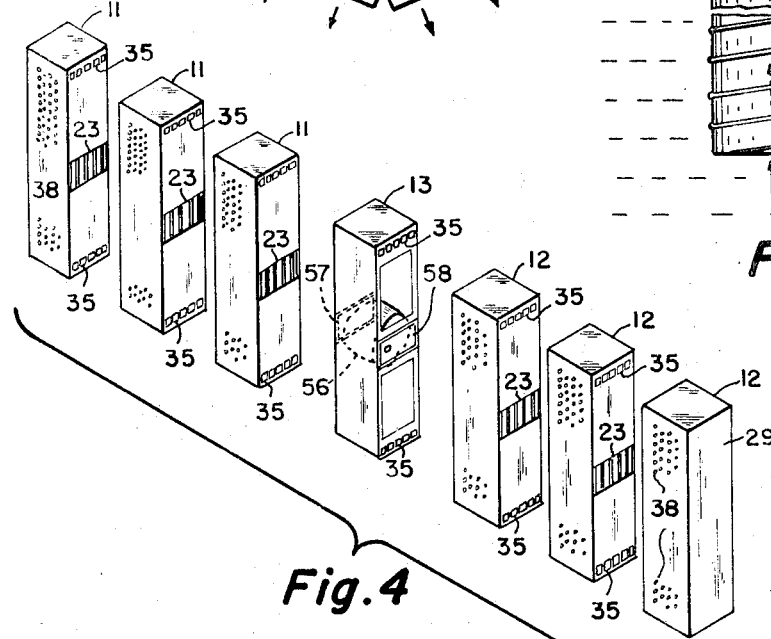
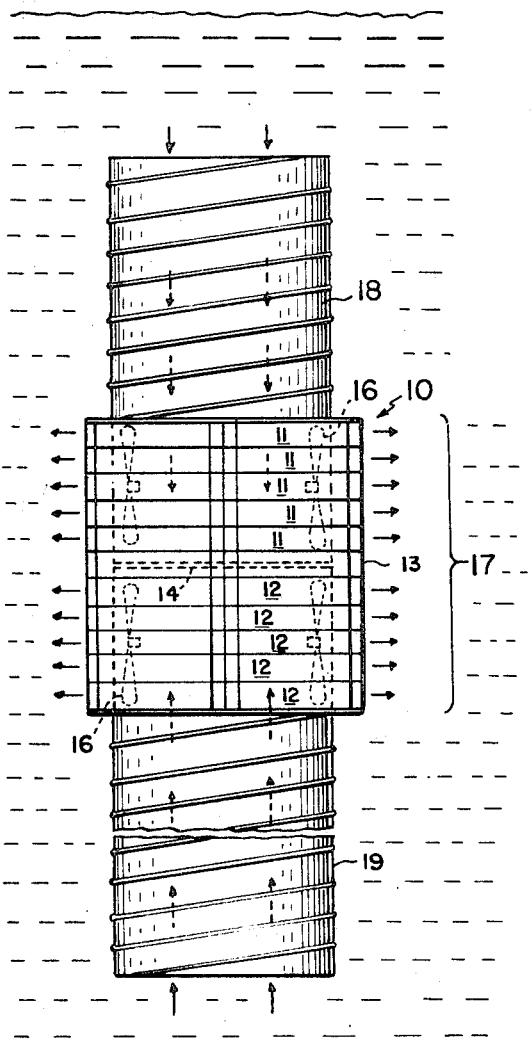
Fig. 1
Fig. 2
Fig. 3
Fig. 4
INVENTOR.
Clarence Zener
BY
HIS ATTORNEYS INVENTOR.
Clarence Zener INVENTOR.
Clarence Zener

PATENTED APR 23 1974 3,805,515

INVENTOR.
Clarence Zener

BY
HIS ATTORNEYS

MODULARIZED SEA POWER ELECTRICAL GENERATOR PLANT

My invention relates to a means for effeciently utilizing the temperature differential between the warm and cold layers of the ocean, thermoclines, for generating electrical power. In particular, my invention relates to the modularization of the boiler, condenser and turbine assemblies to achieve economies of scale for any plant regardless of size.

The work potential created by the temperature differentials between the warm layers of tropical oceans and the cold lower layers was recognized early by D'Arsinval (Arosonval, Revenue Scientique, Sept. 17, 1881.) The ability to utilize and take advantage of this work potential was explored and found feasible by George Claude (52 Mechanical Engineering 1039 (Dec. 1930); U.S. Pat. No. 2,006,985). The early work stimulated others to design equipment for the utilization of this vast store of potential energy. Attempts were made to engineer systems for the low cost production of electrical energy; examples include U. S. Pat. No. 2,595,164 and 3,312,054.

The propasals to create feasibly engineered systems have contributed to the present knowledge as how best to utilize the potential energy stored in the thermoclines. The proposals have not, however, as a practical matter set forth an efficient means for creating electrical energy at a cost per kilowatt lower than the present fossil fuel systems. The inability to achieve a lower per kilowatt cost hour than fossil fuel has been due largely to the fact that each sea power plant has been a unique and specialized endeavor designed to meet a single size requirement. Thus, all of the proposed units having a different size require a custom specialized design and fabricating technique. With such a system, it is not possible to achieve any significant economies of scale.

I provide a sea power generating system or plant which overcomes the heretofore inherent problems of the prior art units by providing modularized boiler, condenser, and turbine units which are adapted for stacking in vertical arrays. I provide modules which are adapted to in-plant fabrication techniques as well as economies of scale associated with a large number of mass produced units. A generating plant of any output requirement can be constructed by enlarging or subtracting the number of stacked arrays. While practical size limitations are inherent in the design construction of any system, I provide a system which is far more flexible than any system heretofore encountered. Further, any number of generating plants can be interconnected to provide economies of standardization. Accordingly, it is possible to construct a sea power generating plant that will produce electrical power at a cost per kilowatt hour lower than existing or proposed fossil fuel units.

By utilizing the modularized units of my invention, on-site construction is kept to a minimum. In conventional fossil fuel power plants a major cost of the unit is the on-site labor and, in particular, the boiler assemblage. The cost is not only high per hour but the efficiency per man hour is considerably less than that found in a manufacturing plant. The modularized units are designed for mass production utilizing the economies of scale associated therewith. For presently built power plants, both fossil and nuclear fuel, all factory production is on a job shop basis and each item is designed and built for the particular power plant. This procedure not only raises the manufacturing costs but also the engineering costs.

I further provide a module design which permits the power generating plant to contain an assembled array of identical power modules. Each power module is assembled on-site by stacking boiler modules and condenser modules to an engine module. Each of these individual modules has essentially the maximum dimensions allowable for ready transportation by truck, rail or ship, namely, 8×8×40 feet.

Generally, I provide a power module which includes five boiler modules, five condenser modules and an engine module. The exact number is not essential, but this arrangement is convenient in that it gives a square face to the boiler and condenser units thus permitting an efficient arrangement for moving water through the boilers and cold water through the condensers. Sea water is moved through the boilers and condensers by means of fans powered by the engine module. Any number of power modules can be connected together to form a generating power plant of any required size. Preferably, the power units are connected together in polygonal fashion and include an impervious membrane between the boiler and condenser units inside the polygon. The power plant is buoyant and is placed below the surface of the ocean. To direct the warm surface water to the boilers and the cold bottom water to the condensers, I provide a pair of pipes secured to the top and bottom of the assembled power units, respectively.

In operation the plant is charged with a medium such as ammonia that is responsive to the temperature variations of the thermoclines generally found in the tropical seas. Warm water is brought down from the surface through the upstanding pipe by means of the fans associated with the boiler units. The warm water is forced through the boiler tubes to vaporize the liquid in the boiler. The pressurized vapor in each boiler module is directed to a central channel in the boiler array to the turbine in the turbine module. Thereafter it expands into the condenser array and thus into each condenser module where it is condensed by contact with the condenser tubes. These tubes are cooled by bringing cold water from the ocean bottom through the depending pipe.

To better understand the nature of my invention as well as the advantages derivable therefrom a perusal of the following detailed description of one presently preferred embodiment of my invention taken in connection with the drawings of which:

FIG. 1 is a side elevation of my invention in its operating position;

FIGS. 2–3 are plan views, without the pipe, illustrating variable size power plants;

FIG. 4 is an isometric view of a power unit showing three boiler and condenser modules pictorially arranged on its side for purpose of illustration;

Figure 5:
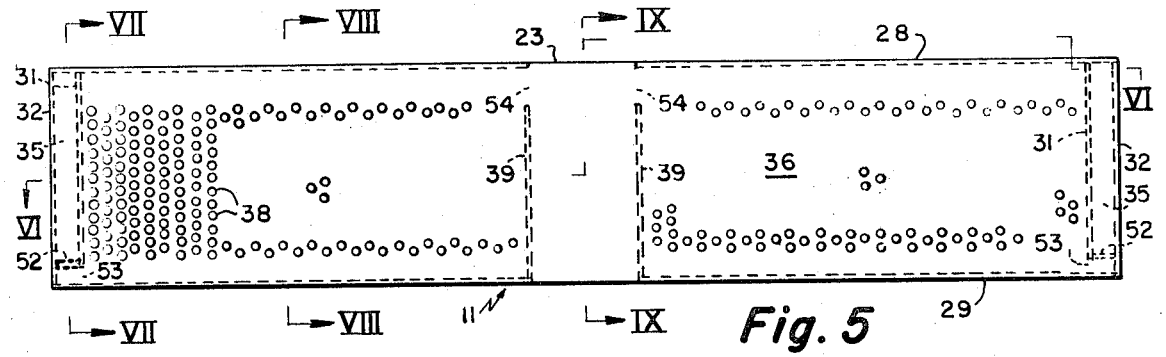
FIG. 5 is a front elevation of boiler module.
Figure 6:
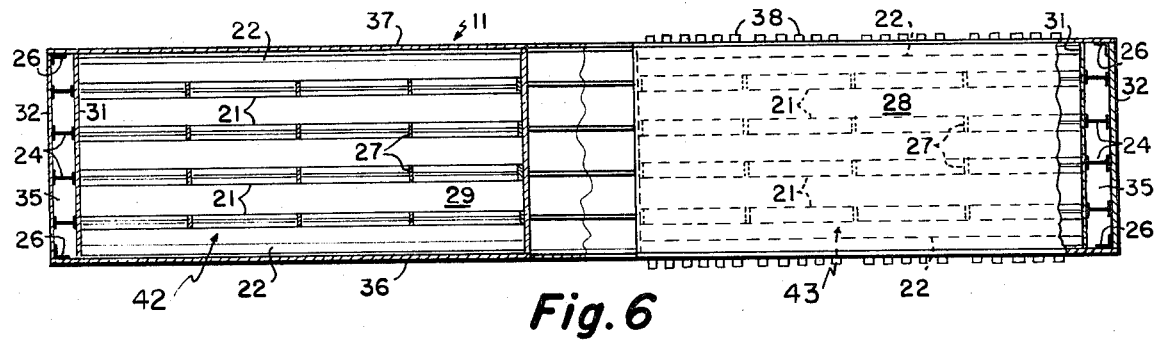
FIG. 6 is a plan view and section of the boiler taken on VI—VI of FIG. 5.
Figure 7:
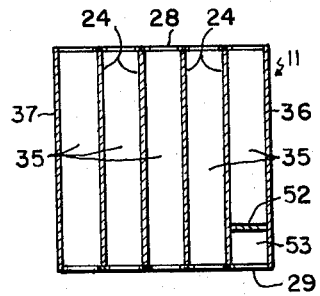
FIG. 7 is a section taken along line VII—VII of FIG. 5.
Figure 8:
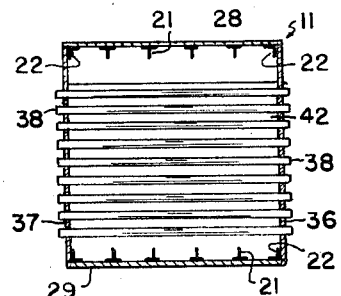
FIG. 8 is a section taken along line VIII—VIII of FIG. 5.
Figure 9:
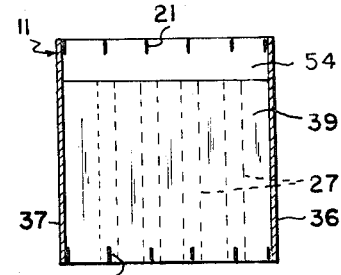
FIG. 9 is a section taken along line IX—IX of FIG. 5.

Referring to FIGS. 1 through 4, a modularized power plant 10 includes a plurality of boiler modules 11 and condenser modules 12. Each module is preferably of a size convenient for transportation, e.g., 8×8×40'. Between the stacked array of boiler modules and the condenser modules is an engine or turbine module 13. Extending from the engine modules 13 and separating the areas enclosed by the boiler and condenser modules 11 and 12 is an impervious membrane 14. Membrane 14 is preferably made from a thin sheet of fabric or other fibrous material rendered impervious to the ocean water. Preferably, five boiler modules and five condenser modules are connected to each engine module to comprise a power unit 17. Since the modules are approximately 8×8×40', five modules provide a square surface. Each power unit 17 includes a pair of fans 16 for moving water through the array of boilers on the one hand and through the array of condensers on the other. The utilization of a square surface arrangement optimizes the usefulness of the fans.

Power units 17 are preferably arranged in the form of a polygon or closed figure, FIGS. 2–3. Secured to the top of the arranged power units 17 is a warm water pipe 18 designed in a manner to permit on-site fabrication, as set forth hereinafter. To the bottom of the coupled array of power units is a second or drop pipe 19 of substantial length designed to reach within the proximity of 5°C temperature and fabricated in a manner similar to pipe 18. By arranging power units 17 in a polygonal arrangement, maximum advantage can be achieved by the use of single warm and cold water pipes. The warm water is brought from the surface through pipe 18 by means of fans 16 and then forced out through the boiler units 11. The cold water is brought up from the depths of the ocean through pipe 19 by fan 16 and forced into the ocean through the condenser units 12. To obtain greater flow characteristics, a centrifugal type fan can be mounted at the interface of each pipe and polygonal array. Membrane 14 prevents the water from both sources from intermingling prior to its discharge through the respective modules. After discharge the water intermingles but does not substantially affect either the temperature of the surface or bottom current water.

Figure 16:
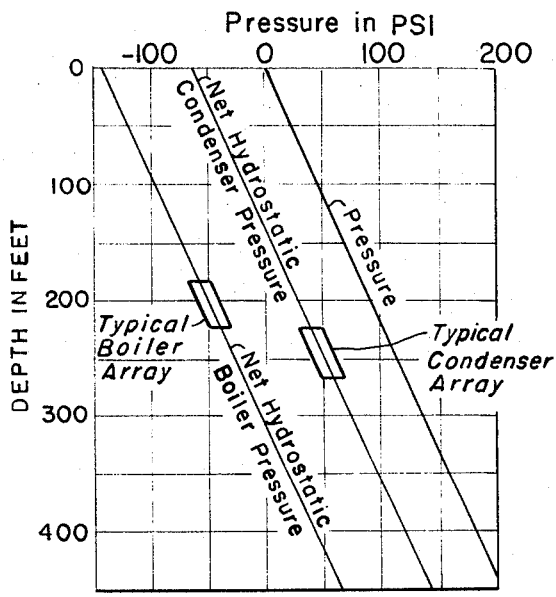
FIG. 16 is a graph showing the relationship between pressure and depth.

The power plant 10 is designed to operate at a depth of about 400'. FIG. 16 gives the hydrostatic pressure at various depths. Utilizing an internal pressure, for example of ammonia, of approximately 140 psi, the plant can be lowered to a depth of 400' without any part undergoing a net external pressure (hydrostatic pressure less internal pressure) of greater than 140 psi. Further, at a depth of 225', the boiler is under a maximum internal pressure of 60 psi and the condenser is under a maximum net external pressure of 60 psi. Thus it is necessary that boiler and condenser modules be designed with maximum strength and minimum weight to have positive buoyancy.

Referring to FIGS. 5–9, a boiler module 11 is provided with sufficient support to maintain the system against variations in net external pressures yet maintain a positive buoyancy. For the most part, the condenser modules are of the same design to facilitate mass assembly techniques. The preferred embodiment shown includes a frame or support system that in combination with the heat exchanger tubes and enclosure plates provides minimum strength. Minimum weight can be achieved by using aluminum structurals, etc., or light alloys. Preferably one type of metal is selected to obviate the corrosion problem of dissimilar metals. The support structure includes longitudinal beams 21 preferably T-beams. The T-beams are inverted on the bottom of the module and, as shown, four T-beams are provided at each top and bottom of the module. The longitudinal edges of the module utilize corner angle beams 22. Each of the modules is provided with a central vapor channel 23 for directing the vapor to or from the various heat exchanger tube assemblies. Thus, so as not to impede the flow of vapor through this channel, the top part of the flanges of T-beams 21 are removed. This is true with respect to the corner angles beams also. However, since both the top most side of the top boiler module and the bottom most side of the bottom most condenser are exposed to the ocean, the flange need not be removed.

Vertical support for beams 21 and 22 is provided by a set of H or I beams 24 located at the ends of the modules. Beams 24 are preferably positioned so that their flanges ar perpendicular to the longitudinal axis of the module. Beams 24 correspond in number to the number of T-beams 21. Vertical corners of the module are supported by L-beams 26 which are equal in number to the number of corner angle beams 22. To provide additional support throughout the length of the module as well as horizontal support for the heat exchanger tubes, a plurality of nonflanged beams 27 are established between the webs of the T-beams and between the corner angle beams. A set of beams 27 are preferably located at the central vapor channel 23 to provide additional strength where the flanges have been removed from the T-beams.

The entire module is enclosed or encapsulated by a set of plates or covers which are sealingly secured to the flanges of the support members. These plates are preferably sealed to maintain a tight seal for the ammonia vapor which is found within the module and of a thickness sufficient to withstand the net hydrostatic forces. The tops of the modules are provided with a pair of plates 28 and the bottom with a pair of plates 29. These plates enclose the respective portions of the module except where the central vapor channel is located. As stated above, the top-most boiler and bottom-most condenser is provided with single plates 28 and 29 respectively, since no channel is provided thereat. Each end of the module includes a pair of plates 31 and 32. Inner plate 31 and outer plate 32 are sealingly secured to the associate flanges of beams 24 and 26. It is preferred that the plates be sealingly secured so as to establish in combination with the beam a plurality of chambers 35. Front and back plates 36 and 37 respectively are provided to enclose the entire unit. These plates are provided with a plurality of openings adapted to receive heat exchanger tubes 38. Plate 39 is provided along the central vapor channel 23 to define said channel in combination with the front and back plates.

Figure 10:
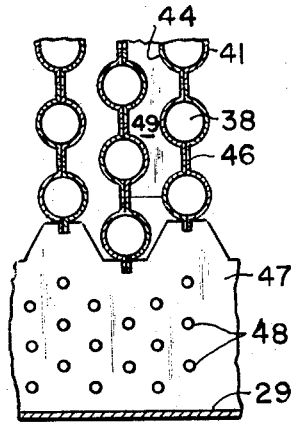
FIG. 10 is an exploded partial view of the tubes and spacers therefor used in the boiler and condenser modules.
Figure 11:
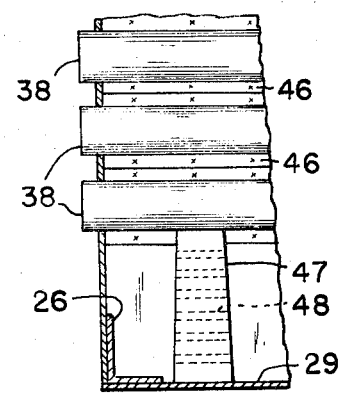
FIG. 11 is a side view of the tubes shown in FIG. 10.
Figure 12:
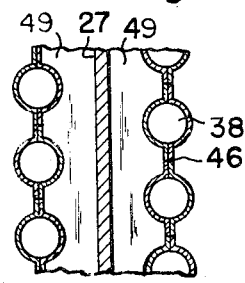
FIG. 12 is an exploded partial view of the tube arrangement shown in FIG. 10 having a support member.

In combination with tubes 38 plates 28, 29, 31, 36, 37 and 39 provide a pair of fluid tight, except for opening 53 and 54, enclosure areas 42 and 43 for each module. Each enclosure includes a plurality of tubes 38 which can be economically made by pressure welding a pair of aluminum sheets 41 and 44 with strips of parting material, FIG. 10. The resulting strip channels are blown apart in a manner well known in the art to form a plurality of tubes 38 having supporting webs 46. The vertical tube arrays are supported by the lower inverted T-beams 21 or by support members 47, FIGS. 10–11. Members 47 or inverted T-beams 21 preferably include a plurality of openings 48 to permit liquid ammonia to flow between the members and cover the entire floor area of each enclosure. The tube assembly extends to about 1.5 feet of the top of each module. To provide lateral rigidity, spacers 49 can be intermittently included. The web of the tube array extends preferably to the bottom of each T-beam 21. The T-beams form a vapor head passage to central vapor channel 23.

Figure 13:
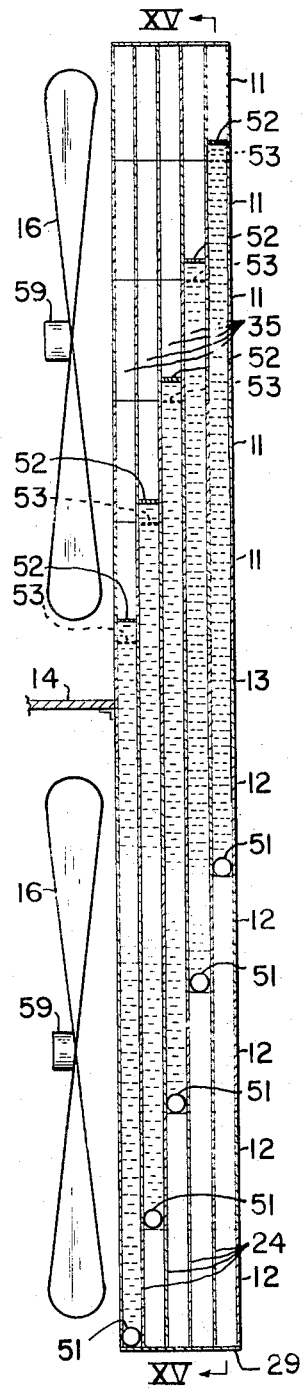
FIG. 13 is a section of a power unit on XIII—XIII of FIG. 15.
Figure 14:
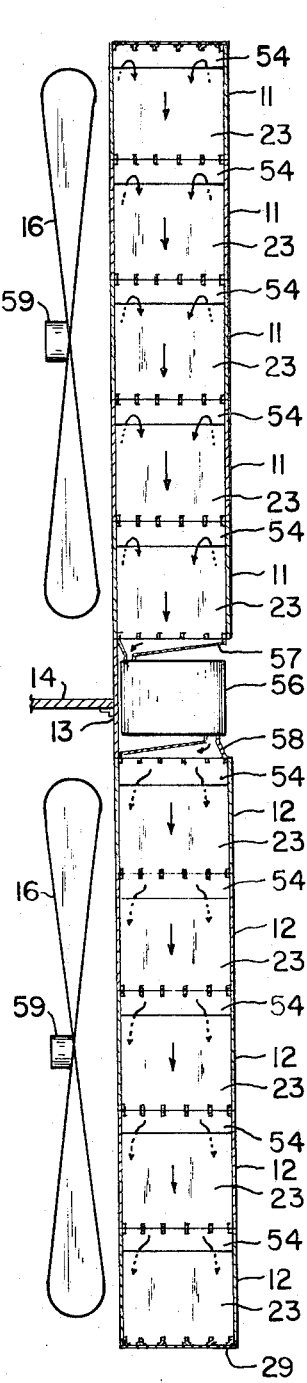
FIG. 14 is a section of a power unit shown on XIV—XIV of FIG. 15.
Figure 15:
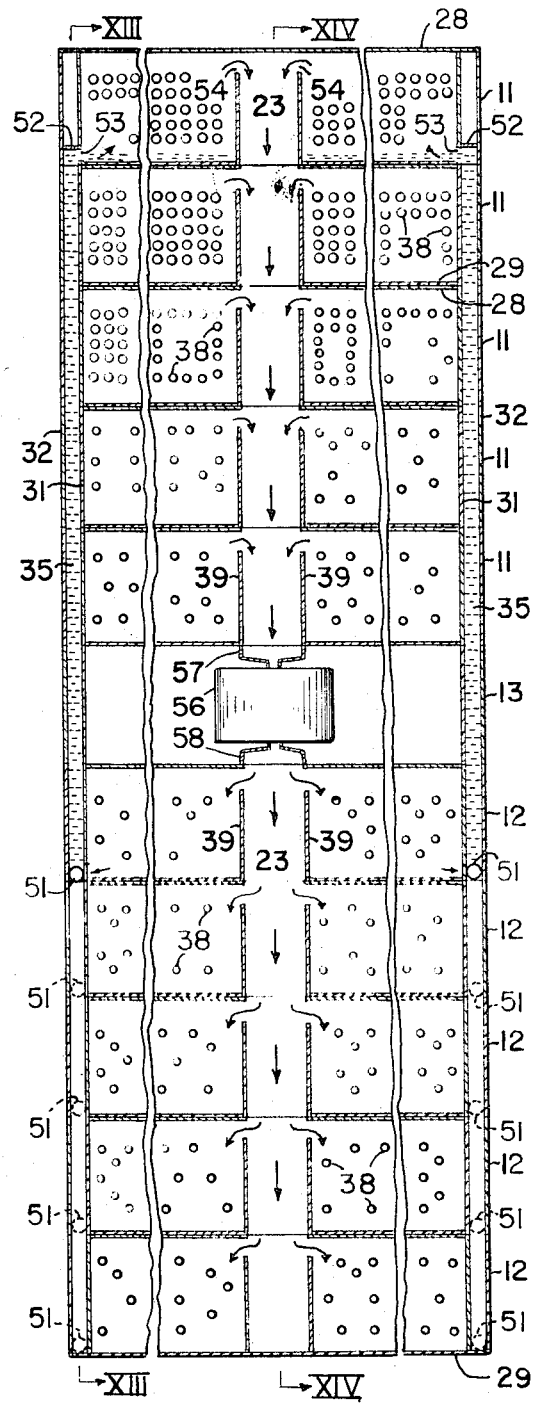
FIG. 15 is a section of a power unit on XV—XV of FIG. 13.

Liquid ammonia or other suitable fluid is pressurized and pumped from the condenser units by means of pumps 51 to each boiler module through channels 35, FIGS. 13–15. For example, the bottom most condenser would supply the bottom most boiler module and top most condenser would supply the top most boiler, etc., FIGS. 13 and 15. Thus, it is preferable to include the same number of channels or pipes 35 as there are boiler-condenser combinations. Each channel includes a plate 52 associated with the respective boiler to which it supplies fluid. Fluid enters the respective boiler enclosures through openings 53, FIG. 9, located at the bottom of the module through plates 31. The liquid or fluid then "floods" the floor of the module by passing through openings 48 and between channels defined by beams 21 or supports 47. The warm water passing through tubes 38 vaporizes the liquid which escapes under pressure to central vapor channel 23 through openings 54.

The vaporized fluid is directed from the enclosures down the vapor channel 23 of the boilers, which is sealed to the outside, to turbine 56 through pipes 57. Vapor is discharged through pipe 58 into the sealed central vapor channel of the condenser, FIGS. 14 and 15. The vapor enters each enclosure through openings 54 and is condensed over tubes 38 cooled by cold water flow pipe 19. The condensed fluid is pressurized and pumped back to the boilers through channels 35 by pumps 51.

The engine module is preferably designed to be open to the sea so as to reduce its weight. Accordingly, a frame work similar to the other modules may be used without some of the supporting beams. Channels 35 between the condenser and boiler modules can either comprise pipes or plates 31 and 32 together with H or I beams 24. The turbine can be of any design adaptable for use with ammonia or similar fluid. Preferably, the turbine will be protected against the effects of sea water by means of encapsulation. Part of the power generated by the turbine is used for powering fan motors 59 or a pair of centrifugal fans.

Figure 21:
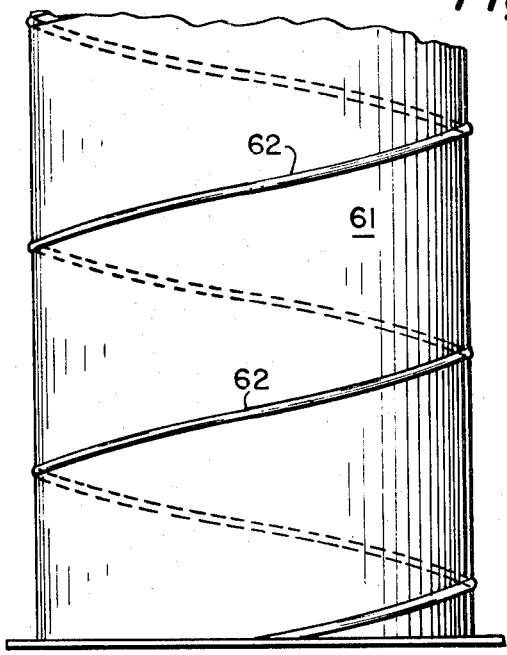
FIG. 21 is an elevation of the pipe construction.
Figure 22:
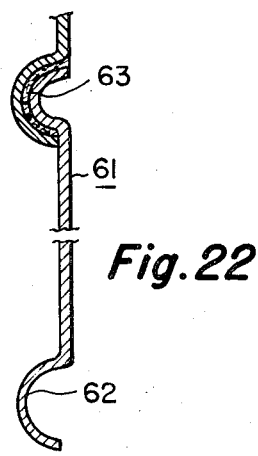
FIG. 22 is a sectional view of the means for joining a spiral section of pipe.

Pipes 18 and 19 are made by spiral assembly 61, FIGS. 21 and 22. This is preassembled at the factory in the form of a coil having rolled grooves 62 formed for on-site assembly with a sealing compound 63, for example, or for welding. To increase the efficiency of the unit, insulation (not shown) can be mounted to the interior of the coils. The coils for pipes 18 and 19 are initially fastened to the assembled power units by means of welding to the top and bottom plates 28 and 29 of the top most boiler and bottom most condenser, respectively, or to a formed plate for insertion thereon (not shown).

Figure 17:
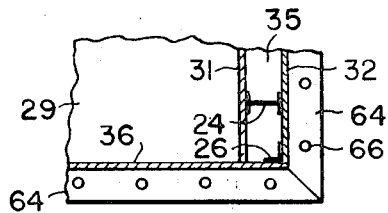
FIGS. 17–18 are sectional plan and elevational views of a modular connecting means.
Figure 18:
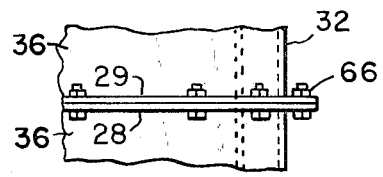
Figures 19, 20:
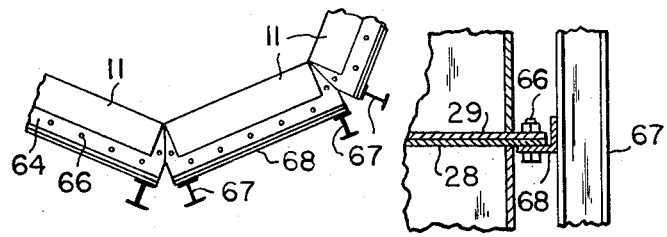
FIGS. 19–20 is another embodiment of a connecting means utilizing outside support members.

The modules are fitted together by means of compression clamping 66 of flanges 64 of plates 28 and 29, FIGS. 17 and 18. Preferably gaskets are utilized about channels 35 and the central vapor channel areas. Where additional rigidity of the system is required, support beams 67 can be utilized, FIGS. 19–20. Beams 67 can be mounted to flanges 64 by means of compression clamps 66 and brace 68.

The operation of a modular unit such as has been described herein requires a neutral buoyancy, i.e., its submerged weight must be essentially zero. This is required to facilitate at sea assembly of the large intake pipes as well as to eliminate the need for special buoyancy equipment. However, it is to be noted that buoyancy equipment would not add significantly to the total cost and is well known to those skilled in the art. Thus, to achieve this desired effect the boiler and condenser modules should have a positive buoyancy to support the power equipment and the pipes. The pipes, it should be noted, can preferably be provided with a neutral buoyancy by using a rigid foamed insulation material. I prefer a positive lift from the modules of approximately 630,000 lbs., sufficient to permit the use of 12 lbs. per kilowatt of power equipment. A module 40×8×8' includes 2,560 cu. ft. and a buoyant force of 158,000 lbs. The weight within each module comprises primarily the ammonia fluid, heat exchange surfaces, and the support structure necessary to withstand a net pressure.

The following nonlimiting example is illustrative of the power characteristics of my invention:

POWER CHARACTERISTICS

| | |
|---|---|
| Optimum flow volume in tubes | 10 ft/sec |
| Total tube cross sectional area | ½ × 33' × 6' = 100 ft² |
| Volume flux | 1,000 ft³/sec |
| Mass flux | 62,000 lbs/sec |
| Heat flux at 2°C temperature drop | 220,000 BTU/sec |
| Eff. = .66 (9/300) = 2% | |
| Gross power per boiler module (1 BTU/sec = kw) | 4,400 kw |
| Gross power per power unit | 22,000 kw |
| Net power per power unit | 15,000 kw |
| Boiler Design | |
| Tube length | 8' |
| Flow velocity | 10 ft/sec |
| Heat transfer coefficient (h) | 1,000 BTU/ft² hr. °F |
| $h \cdot A \cdot \Delta T = 360{,}000 \times 3{,}600$ BTU/hr | |
| A | 130,000 ft² |
| $n \cdot \pi D$ | 16,250 ft |

$$n \cdot (\pi/4) D^2 = 0.5 \times 33 = 100 \text{ ft}^2$$
$$D = 0.30''$$
$$n = 200{,}000$$

While I have shown a presently preferred embodiment of my invention, it may otherwise be embodied within the scope of the appended claims.

I claim:

1. A modularized generating plant for converting the work potential of the ocean thermoclines to electrical energy comprising a power unit submerged in the ocean, said power unit comprising at least one vertically stacked boiler and associated condenser modules having disposed therebetween an engine module, said boiler, condenser, and engine modules being disposed to form a closed system for circulation of a working fluid, said engine module being connected to receive pressurized working fluid vapor from said boilers and for discharging the vapor to said condensers, and means for supplying and pressurizing condensed vapor from a condenser module to an associated boiler module, at least one pipe extending downwardly from the power unit and adapted to bring cold water from near the bottom of the ocean and at least one pipe extending upwardly from the power unit and adapted to bring warm water from near the top of the ocean to the condenser and boiler modules respectively and at least one fan associated with each pipe to pump water through the boiler and condenser modules and to discharge water from the boiler and condenser modules directly into the ocean at the level of the power unit.

2. A modularized generating plant as set forth in claim 1 having a plurality of power units.

3. A modularized generating plant as set forth in claim 1 wherein said power unit comprises a plurality of vertically stacked boiler and associated condenser modules.

4. A modularized generating plant as set forth in claim 1 having a plurality of power units, each of said power units comprising a plurality of vertically stacked boiler and condenser modules, said plurality of power units being connected together to form an enclosed geometric form.

5. A modularized generating plant as set forth in claim 4 wherein said enclosed form of power units includes a membrane spanning said form positioned between the respective condenser and boiler modules.

6. A modularized generating plant as set forth in claim 5 including a pair of pipes one each for each half of the enclosed form and a fan associated with each of said halves.

7. A modularized generating plant for converting the work potential of the ocean thermoclines to electrical energy comprising a plurality of power units submerged in the ocean and connected to form an enclosed geometric form, each power unit adapted for buoyancy submersion and including at least one each of a boiler, condenser, and engine module, where said engine module is positioned between the condenser and boiler modules, said boiler, condenser, and engine modules being disposed to form a closed system for circulation of a working fluid, a membrane spanning the geometric form and positioned between the boiler and condenser modules; at least two vertically extending pipes, one pipe depending downwardly from the condenser side of the membrane to water at a temperature of about 5°C and said other pipe extending upwardly from the boiler side of the membrane to a warmer upper layer of the ocean; and at least two fans, one each per pipe, to bring the respective waters through the pipes to be discharged through the boiler and condenser units, said fans discharging water from the boiler and condenser units directly into the ocean at the level of the power units.

8. A modularized generating plant for converting the work of the ocean thermoclines to electrical energy comprising:
   A. a plurality of power units connected to form an enclosed geometric form, each power unit being adapted for buoyant submersion, forming a closed circuit for circulation of a working fluid, and including at least one
      i. modular boiler,
      ii. modular condenser,
      iii. modular engine, said engine being connected between the boiler and condenser modules in vertical array and adapted to receive pressurized working fluid vapor from said boiler and to discharge working fluid vapor from said condenser, and
      iv. means for pressurizing and discharging the condensed vapor from the condenser to the boiler module;
   B. a membrane spanning the geometric form and positioned between the condenser and boiler modules;
   C. a pair of pipes, one of said pipes depending from internally of the geometric form on the condenser side of the membrane downwardly to about 5°C temperature level of the ocean and said other pipe extending from internally of the geometric form on the boiler side of the membrane upwardly to the warmer upper layer of the ocean; and
   D. a pair of fans, one each associated with the two pipes, one fan operable to discharge cold water through the condenser modules directly into the ocean at the level of the condenser modules and said other fan operable to discharge water through the boiler modules directly into the ocean at the level of the boiler modules.

9. A buoyant modular unit for use in a modularized generating plant each module comprising a pair of fluid tight enclosures having therebetween a vapor channel adapted for fluid tight connection with another like module channel, an opening between said enclosures and said channel; at least one vapor passage for each enclosure and adapted for fluid tight connection with another like module, an opening between each enclosure and its associated passage, a plurality of heat exchanger tubes extending through said enclosures for the passage therethrough of sea water.

10. A module as set forth in claim 9 wherein each module includes a plurality of passages, one of said passages being open to a respective enclosure and adapted for connection with an associated module of reverse function.

11. A module as set forth in claim 9 having a rectangular shape including a size adapted for highway and railway shipment, said heat exchanger tubes, channel and passage being perpendicular to the longitudinal axis of said module.

12. A module as set forth in claim 9 wherein the channel opening is located at the top of said enclosure and the passage opening is located at the bottom of said enclosure.

13. A module as set forth in claim 12 wherein the heat exchanger tubes fill substantially all of said enclosures except where a portion of said top and bottom of said enclosure is maintained free of the tubes to provide an unrestricted vapor head and liquid foot, respectively.

14. A module as set forth in claim 9 wherein said heat exchanger tubes support the enclosures against pressure differences between the ocean pressure and the vapor pressure inside said module.

15. A module as set forth in claim 9 wherein each of said modules includes circumferential flange member adapted for connecting like modules together.

16. A module as set forth in claim 9 wherein said modules are adapted for either use as a boiler or a condenser.

* * * * *